US012711142B2

(12) United States Patent
Micaelian

(10) Patent No.: US 12,711,142 B2
(45) Date of Patent: Aug. 18, 2026

(54) ARTIFICIAL INTELLIGENCE SYSTEM AUGMENTED WITH AN EXPERT SYSTEM SCALED WITH GENERATIVE ARTIFICIAL INTELLIGENCE

(71) Applicant: Sparkdit Inc., Menlo Park, CA (US)

(72) Inventor: Fadi Victor Micaelian, Menlo Park, CA (US)

(73) Assignee: Sparkdit Inc., Menlo Park, CA (US)

( * ) Notice: Subject to any disclaimer, the term of this patent is extended or adjusted under 35 U.S.C. 154(b) by 0 days.

(21) Appl. No.: 18/827,737

(22) Filed: Sep. 7, 2024

(65) Prior Publication Data

US 2025/0086191 A1 Mar. 13, 2025

Related U.S. Application Data

(60) Provisional application No. 63/537,488, filed on Sep. 9, 2023.

(51) Int. Cl.
*G06F 16/00* (2019.01)
*G06F 16/248* (2019.01)
*G06F 16/383* (2019.01)

(52) U.S. Cl.
CPC .......... *G06F 16/248* (2019.01); *G06F 16/383* (2019.01)

(58) Field of Classification Search
CPC ............................ G06F 16/248; G06F 16/383
USPC ................................................ 707/600–899
See application file for complete search history.

(56) References Cited

U.S. PATENT DOCUMENTS

| | | | | |
|---|---|---|---|---|
| 6,714,929 | B1 | 3/2004 | Micaelian et al. | |
| 7,194,458 | B1 | 3/2007 | Micaelian et al. | |
| 7,624,083 | B2 | 11/2009 | Micaelian et al. | |
| 7,836,057 | B1 | 11/2010 | Micaelian et al. | |
| 7,979,375 | B2 | 7/2011 | Micaelian et al. | |
| 8,620,717 | B1 | 12/2013 | Micaelian et al. | |
| 12,197,496 | B1 * | 1/2025 | Chakrabarty | G06F 16/538 |
| 2019/0339824 | A1 * | 11/2019 | Hamedi | G06V 10/761 |
| 2023/0104757 | A1 * | 4/2023 | Pramod | G06N 3/0475 706/11 |
| 2024/0314093 | A1 * | 9/2024 | Mehta | H04L 51/063 |
| 2024/0330742 | A1 * | 10/2024 | Hunn | G06N 20/00 |
| 2024/0420216 | A1 * | 12/2024 | Stankiewicz | G06Q 30/0643 |
| 2025/0005021 | A1 * | 1/2025 | Mudulodu | G06F 16/24534 |
| 2025/0029172 | A1 * | 1/2025 | Golconda | G06Q 30/0625 |

* cited by examiner

*Primary Examiner* — Michelle N Owyang
(74) *Attorney, Agent, or Firm* — Appleton Luff

(57) ABSTRACT

A computer application is generated by receiving a category that specifies a class, or group, of items comprising things or people that share a commonality or a common attribute. Criteria of the category are generated by artificial intelligence or by retrieval from storage. Certain criterion of the criteria are selected as a subset which is scored to generate a scored listing. The scored listing is analyzed to identify data types and data patterns and distribution in each criterion of the scored listing and a structured data set is generated. The application is generated by generating a user interface from the structured data set. The user interface may be used to select a category and in response provide an ordered set of items within the user selected category ordered by criteria of the category. The application may interact with a server that provides a ranking interface and an inference interface.

15 Claims, 12 Drawing Sheets

Criterion a: *function*

Criterion b: *function*

Criterion c: *function*

. . .

AI 124

120

| Item 1 | Item 2 | Item 3 |
| --- | --- | --- |
| Criterion a | Criterion a | Criterion a |
| Criterion b | Criterion b | Criterion b |
| Criterion c | Criterion c | Criterion c |
| . . . | . . . | . . . |

| Category 1 | Category 2 | Category 3 |
| --- | --- | --- |
| Criterion a | Criterion g | Criterion m |
| Criterion b | Criterion h | Criterion n |
| Criterion c | Criterion i | Criterion o |
| . . . | . . . | . . . |

126
Explicit tradeoffs
Category 1
Criterion a
Criterion b
Criterion c
Relative weight
w(a)
w(b)
w(c)
108
Weight generation 126
Implicit tradeoffs
Item
Ranking
Item 1
2
Item 2
3
Item 3
1
Reverse propagation 127
Relative weight
w(a)
w(b)
w(c)
108

124
Criterion 1
Criterion 2
Criterion 3
Criterion 4
Criterion 5
Criterion 6
AI/ML Engine 301
Criterion 1 Score(s)
Criterion 2 Score(s)
Criterion 3 Score(s)
Criterion 4 Score(s)
Criterion 5 Score(s)
Criterion 6 Score(s)
Item Database 302

ARTIFICIAL INTELLIGENCE SYSTEM AUGMENTED WITH AN EXPERT SYSTEM SCALED WITH GENERATIVE ARTIFICIAL INTELLIGENCE

RELATED APPLICATIONS

This application claims priority to U.S. Provisional patent application No. 63/537,488, filed on Sep. 9, 2023, and entitled Artificial intelligence system augmented with an expert system scaled with generative artificial intelligence.

FIELD OF THE DISCLOSURE

This disclosure relates generally to computerized information systems and more particularly to artificial intelligence and machine learning systems with domain knowledge based systems.

BACKGROUND

Artificial intelligence (AI) in the form of machine learning (ML) technology is increasingly being used by computer applications. In order for a conventional AI/ML engine to provide accurate results a large amount of data is required. However, often the required amount of data is not available. For example, in consumer-based applications the data required is often unavailable as it is private data in the control of third parties.

Expert systems, on the other hand, do not require large volume of data. However, they take a lot of time to build as they require significant time to convert domain knowledge of experts into code. Unlike AI/ML where answers can be generated irrespective of the domain so long as there is sufficient data, expert systems need to be programmed for each domain to which they are applied. This is highly time consuming, which limits the scalability of such systems.

What is required is an approach that addresses the data dependency of AI/ML systems with the lack of scalability of expert systems.

SUMMARY

The disclosed systems and methods combine the benefits of AI/ML with expert knowledge to facilitate decision making, selection, or recommendation and the development of related applications. In one aspect, a computer implemented method for generating an application is provided. The method comprises, receiving a category that specifies a class, or group, of items, comprising things or people that share a commonality or a common attribute. An option to generate criteria of the category is provided by providing the category to a generative artificial intelligence service that provides in response to the category a first listing of criteria of the category. Also, a second listing of criteria of the category from storage may be performed. One of the first listing of criteria of the category and the second listing of criteria of the category as a selected listing of criteria are received. Certain criterion of the selected listing of criteria are selected to generate a subset listing of criteria. The subset listing of criteria is scored to generate a scored listing comprising a score associated with each criterion in the subset listing of criteria. The scored listing is analyzed by identifying data types and data patterns and distribution in each criterion of the scored listing and the results are stored as a structured data set in a structured data format. The application is generated by retrieving the structured data set and a user interface for the application is generated, by which a user of the application provides a user selected category and in response receives an ordered set of items within the user selected category ordered by criteria of the category.

In another aspect, a server computer system interacts with an application executing on a client computer system, where the server computer system comprises data storage having stored therein a database that stores information pertaining to items, where each item corresponds to a category, wherein the database includes one or more categories of items. The server computer system further comprises a processor that executes instructions that cause the processor to provide to the application a ranking interface and an inference interface. The ranking interface receives from the application a first category and application settings in the form of tradeoffs and applies the tradeoffs to items in the database that correspond to the first category to provide to the application a ranked listing of the items from the database, where each item provided is accompanied with a corresponding score that indicates correspondence of the item to the received tradeoffs. The inference interface receives from the application a second category and an ordered list of choices within the category that indicate a user preference. The processor infers tradeoff values to match the ordering of choices and provides to the application a listing of criteria together with a weight for each criterion, wherein the weights correspond to the user preference. The user preferences are inferred and calculated based on either explicit instructions or based on user behavior or based on ordering a set of results that allow the engine to adjust user preferences in order to calculate the tradeoffs.

In another aspect, a computer-implemented method operates to generate tradeoff-based decisions by determining weighted preference information including a plurality of decision criteria obtained from a generative AI engine from a corresponding plurality of weights representing relative importance of each criterion. The weighted preference information is determined by obtaining a category, obtaining for the category a set of criteria by providing the category to a generative AI engine, and receiving the set of criteria as results from the generative AI engine. A function is identified that corresponds to each criterion of the set of criteria and that reflects the criterion behavior. The function is used to quantify the unweighted contribution of each option for the specific criterion. A set of weights is provided either explicitly or implicitly by inference and a decision is generated by ranking the results based upon the weighted preference information.

Additional aspects related to the invention will be set forth in part in the description that follows, and in part will be apparent to those skilled in the art from the description or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques.

DETAILED DESCRIPTION

Figure 1:
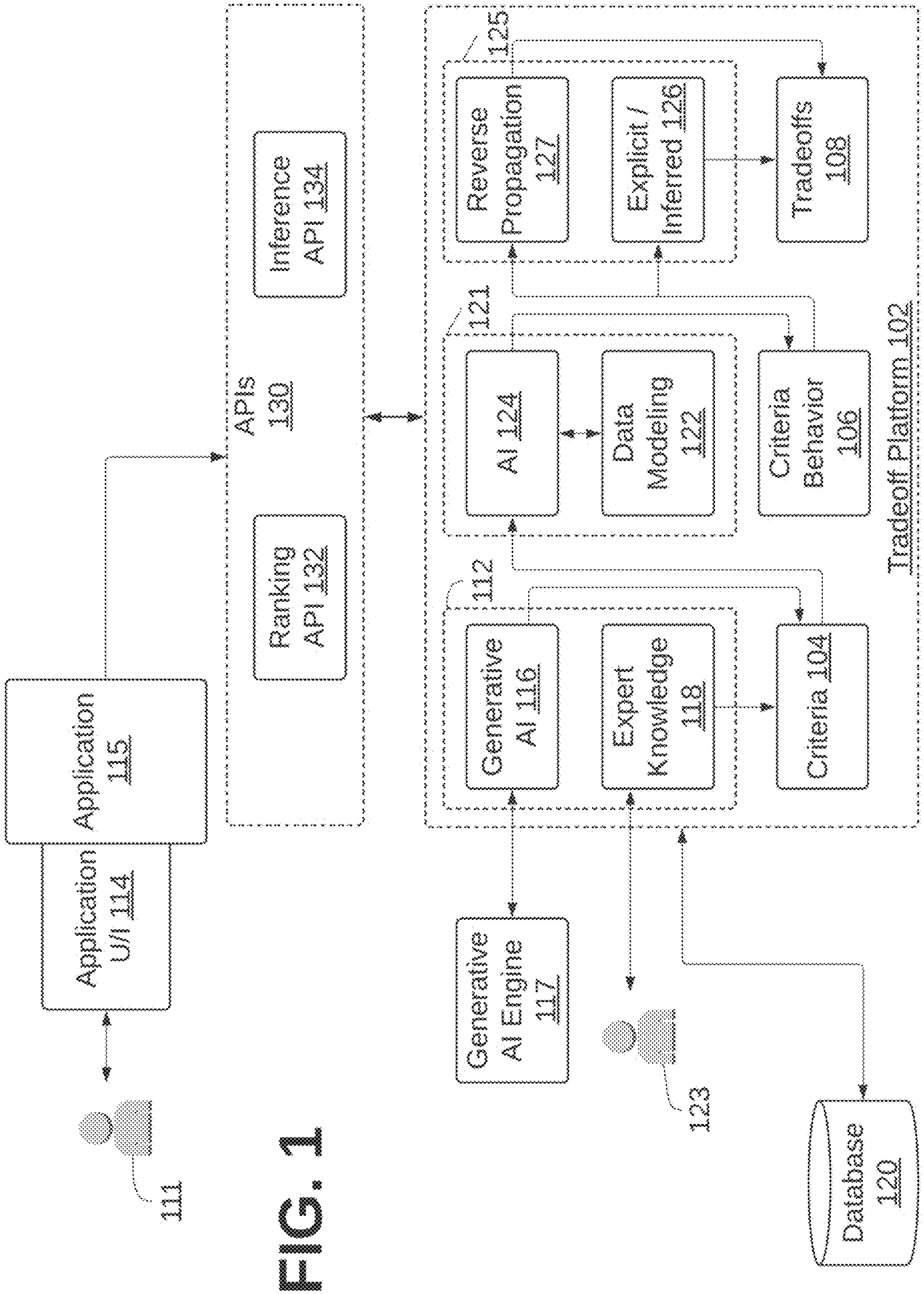
FIG. 1 is a block diagram illustrating high-level operation of tradeoff platform and associated APIs.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of the present invention. The following detailed description is, therefore, not to be construed in a limited sense.

The disclosed embodiments operate in a manner that more closely mimics the way in which humans make decisions. The disclosed embodiments combine AI/ML systems with domain knowledge to address the large data requirements of conventional AI/ML systems. The advantage of conventional AI/ML is that it does not require any domain expertise. All that is required is data and more data to keep training the system. In contrast rule-based systems (also known as expert systems) have lacked the scalability of AI/ML. Every rule-based system needs its rules to be spelled out, which is very time consuming. The disclosed embodiments leverage the benefits of both AI/ML and rule-based systems without inheriting their shortfalls.

The disclosed embodiments leverage the power of conventional AI/ML to automate the generation of rules by selecting the needed utility functions, for example of a tradeoff framework as explained in further detail below. Alternatively, generative AI may be employed in lieu of an expert with domain knowledge to identify criteria, for a given category and from there we can use AI to score each item for that specific criterion.

The requirement of conventional AI/ML of large amounts of data works well with organizations that have access to such large volumes. Such AI/ML systems are designed to provide an answer in a single pass and rely on system design and software code instead of user interaction that may augment the code. Such an approach generally proves to be ineffective on smaller data sets that are encountered in mid-size organizations. For example, a mid-size organization may not have the volume of data required to train an AI/ML engine to accurately predict the likelihood of payment on an account, or the likelihood of a particular user purchasing a particular product. This problem is compounded in consumer applications when intruding on consumer privacy becomes a serious temptation and sometime a necessity to keep up with the competition. The challenge is amplified in enterprise decision applications when the source and level of trust in the data is not uniform.

Conventional AI/ML also lacks the ability to provide insight into causality: unlike the human mind, conventional AI/ML engines by their nature are unable to provide the reason for a classification. They typically act as a black box and have no logical deductive reasoning or intuitive capability to perform any inference. This contrasts with human intelligence which is capable of correlating cause and effect.

The disclosed embodiments leverage the benefits of both conventional AI/ML and rule-based or expert systems while avoiding their inherent shortfalls. The disclosed embodiments leverage both the power of conventional AI/ML to automate the generation of rules by selecting required utility functions. The disclosed embodiments also employ generative AI to identify criteria, for a given category and from there in certain embodiments employ AI/ML to score each item for that specific criterion.

Certain embodiments augment conventional AI/ML with rule-based or expert systems. Tradeoffs may be used to score and rank results. Utility functions employed by a tradeoff engine may be employed to score and rank results. Such a tradeoff engine is described in U.S. Pat. No. 6,714,929, entitled Weighted Preference Data Search System and Method, which was filed on Apr. 13, 2001, and issued on Mar. 30, 2004. The foregoing may be employed to automate the generation of web or mobile applications based on data, human input or both. Certain embodiments may also be able to explain the causes of a given decision or choice by explaining the impact of a particular selection, or an ordered set of results, on various criteria impacting the decision.

The term "category" as used herein refers to a class or group of things, people, etc. that share some commonality or a common attribute. See, "Category." Vocabulary.com Dictionary, Vocabulary.com, https://www.vocabulary.com/dictionary/category. Accessed 16 Jul. 2023. The commonality or common attributes of elements in a category are referred to herein as criteria.

The phrase "tradeoff framework" refers to an environment composed of building blocks that comprise (i) criteria, (ii) criteria behavior, and (iii) tradeoffs. The tradeoff framework disclosed herein also provides a programmatic capability, in the form of application programing interfaces (APIs) made available to build applications. In one embodiment, at least two APIs are provided. Typically, one API serves results or outcomes, and the other provides insight into the selection or decision. Other embodiments may employ additional APIs to render other related services.

The embodiments disclosed herein operate in a manner that shifts the conventional paradigm. Using the AI model of statistical classification alone does not work without large data sets. Human decision-making employs tradeoffs—a balance achieved between two desirable but incompatible features; a compromise. In general, computers lack the ability to perform tradeoffs. Disclosed embodiments employ tradeoffs in conjunction with AI/ML and expert systems to enable computers to perform tradeoffs like humans. In disclosed embodiments, in a selection, recommendation or decision tradeoffs are expressed as the relative importance of the various impactful criteria.

The disclosed embodiments permit augmentation of conventional AI/ML systems with the capabilities of an expert system. The disclosed embodiments provide a system that uses tradeoffs and ordered sets of data to score and rank results and provide a system that uses tradeoff utility functions to score and rank results. Such systems can automate the generation of web or mobile applications based on data, human input or both. Such systems can explain the causes of a given decision or choice by explaining the impact of selection (or ordered set of result) on various criteria impacting the decision.

Turning to FIG. 1, tradeoff platform 102 can be seen to comprise a set of three data structures: criteria 104, criteria behavior 106 and tradeoffs 108. A set of criteria 104 corresponds to a particular category 110 (shown in FIG. 3) provided by or on behalf of a user 111 via a user interface 114 of an application program 115. The criteria 104 for a category 110 are generated by a generative AI module 116 or by an expert knowledge module 118. Generative AI module 116 forms a query in a form required by an application programming interface of a generative AI engine 117 and receives from the AI engine 117 a set of criteria. Expert knowledge module 118 retrieves a list of criteria from database 120 that may be provided by one or more experts 123.

For example, if a category 110 provided by a user 111 is a laptop computer, instead of asking the user 111 for the processor or the amount of RAM or the quantity of storage, the disclosed embodiments ask the user about the manner in which the laptop computer is envisioned to be used, for example, usage of the machine in terms of time spent, browsing, messaging, social networking, shopping, gaming or streaming. The responses of the user 111 are received via user interface 114 and provided by application program 115 by way of APIs 130 to criteria generation 112 for generation of corresponding criteria 104 for the laptop computer category. The answer can thus be personalized to meet each user specific needs. Criteria behavior data structure 106 associates to each criterion 104 a logical and/or mathematical operator. Data modeling module 122 provides an extensible library of utility curves to AI module 124 which is trained to identify a utility curve provided by module 122 that fits criteria 104.

Database 120 is shown generally and may take the form of one or more structured data stores to store data provided by and to tradeoff platform 102. Generative AI engine 117 in one embodiment takes the form of a commercially available generative AI engine such as the GPT-4 service available from OpenAI (openai.com) or the Bard service available from Google (bard.google.com).

Tradeoffs 108, or the relative weight (importance) associated to each criterion, are generated by module 126 which accepts tradeoffs explicitly expressed by users or measures the tradeoffs by an inference engine that reverse engineers a decision via reverse propagation engine 127 by inferring tradeoffs based on a given subset ranking. This approach has the advantage of including human user input into the decision making.

The tradeoff platform 102 offers a variety of services via APIs 130 that include a ranking API 132 that ranks the results and a causality API 134 that reverse engineers a decision to derive the importance of the criteria providing means of justifying or insight on the implication of a decision. Ranking API 132 receives from application 115 a category and application settings in the form of tradeoffs and applies the tradeoffs to items in a database, such as database 120, that correspond to the received category to provide to the application 115 a ranked listing of the items from the database, where each provided item is provided with a corresponding score that indicates its correspondence to the received tradeoffs. Inference API 134 receives from application 115 a category and retrieves from a database a set of items that have associated with them an ordering and infers tradeoff values to match the ordering of items and provides to the application 115 a ranked listing of the items from the database, where each provided item is provided with a corresponding score that indicates its correspondence to the received tradeoffs. The frequency with which application 115 generates a query to either API 132 or 134 will vary depending on the frequency with which the associated data changes. In some instances, application 115 will generate a request to API 132 or 134 upon every query received by application 115 and in other instances the application 115 will generate a request to API 132 or 134 periodically and will store the results for reuse.

Figure 2:
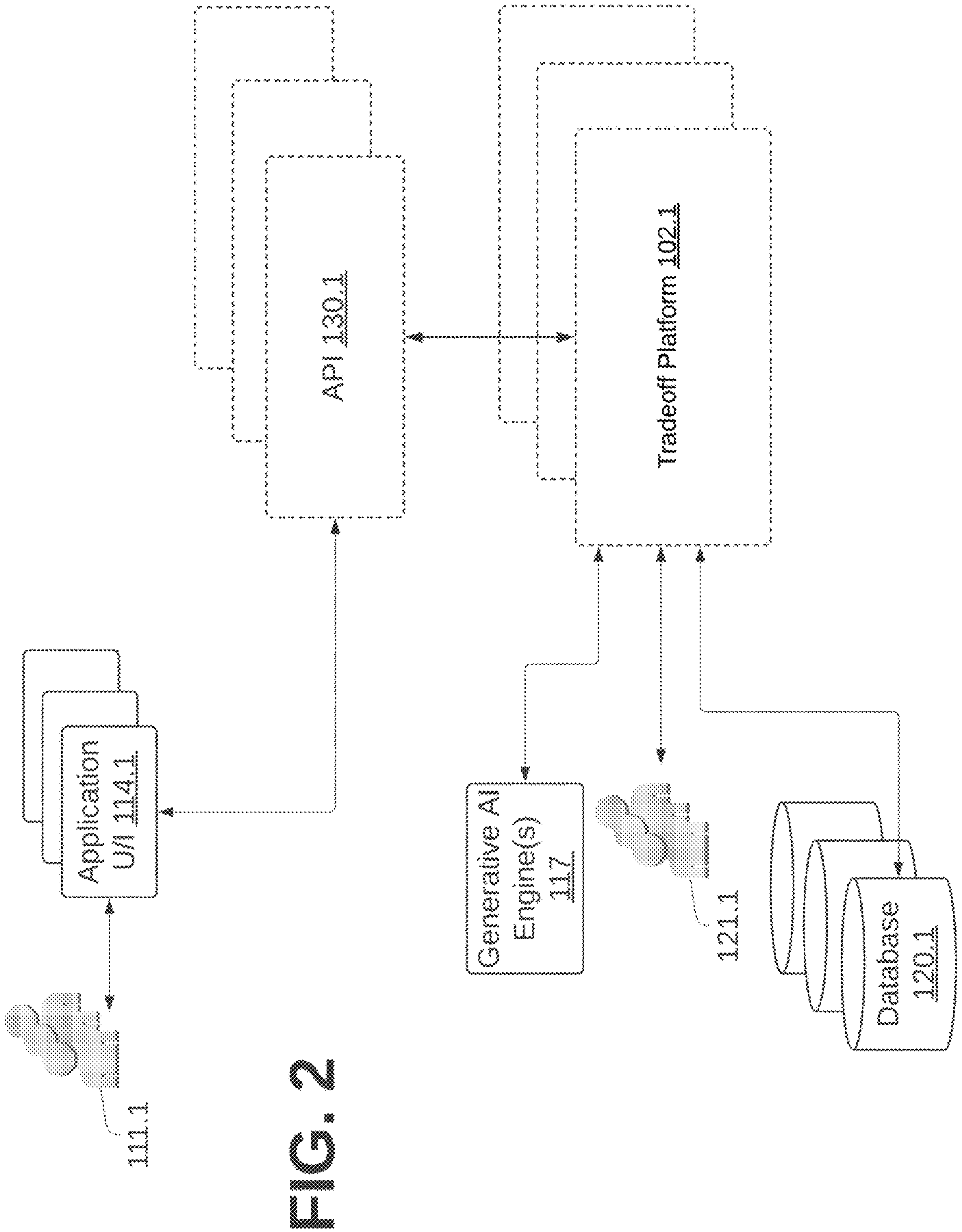
FIG. 2 is a block diagram illustrating deployment of the tradeoff platform and APIs of FIG. 1 in conjunction with multiple applications.

The tradeoff platform 102, APIs 130 and database 120 in one embodiment are associated with a corresponding application UI 114 and a corresponding application 115 (not shown), and each application 115 may have associated with it a corresponding tradeoff platform 102, APIs 130 and database 120 as shown in FIG. 2 where a tradeoff platform 102.1, APIs 130.1 and database 120.1 are associated with an application UI 114.1, application 115.1 (not shown) and other application UIs 114.2, 114.3, etc. and applications 115.2, 115.3, etc. are each associated with a corresponding tradeoff platform 102, APIs 130 and database 120.

Figure 3:
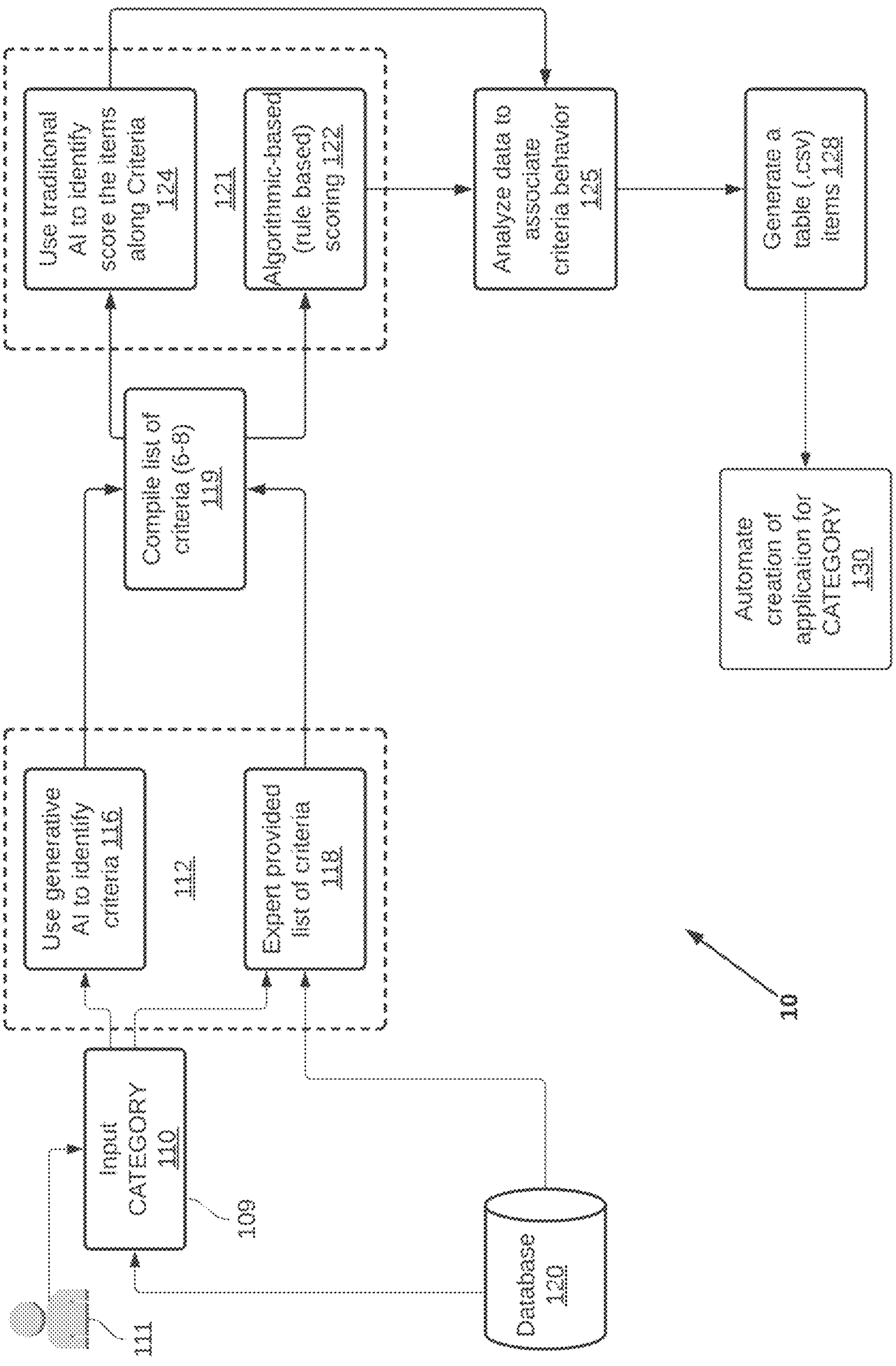
FIG. 3 is a flow diagram illustrating certain operations of FIG. 1 employed in the development of an application.

The operation of the tradeoff platform 102, APIs 130 and database 120 shown in FIG. 1 and FIG. 2 may be better understood by reference to the flowchart of FIG. 3. The system 10 takes at 109 as an input a category 110, which may be entered by a user 111, or may be retrieved from a storage. A category may be any class or group of things, people, etc. that share some commonality or a common attribute. By way of example, some examples of a category are soccer cleat, mutual fund, or laptop, portfolio balance. Operation 112 is then performed to identify criteria corresponding to the provided category. The commonality or common attributes of elements in a category are referred to herein as criteria. By way of example, if the provided category is soccer cleats, then corresponding criteria would include price, brand, color, size, material, and may also include criteria that differentiate the use of soccer cleats such as speed, dribbling, shot strength and precision. Another illustration may be the category television (TV). Some of the characteristics and hence criteria of a TV are its screen size, its price, its brand, its resolution, its display type, its picture format (e.g., HDTV), its connectivity, its refresh rate, its depth, etc.

Operation 112 may employ one or more of two different approaches to identify criteria for a provided category.

Figure 4A:
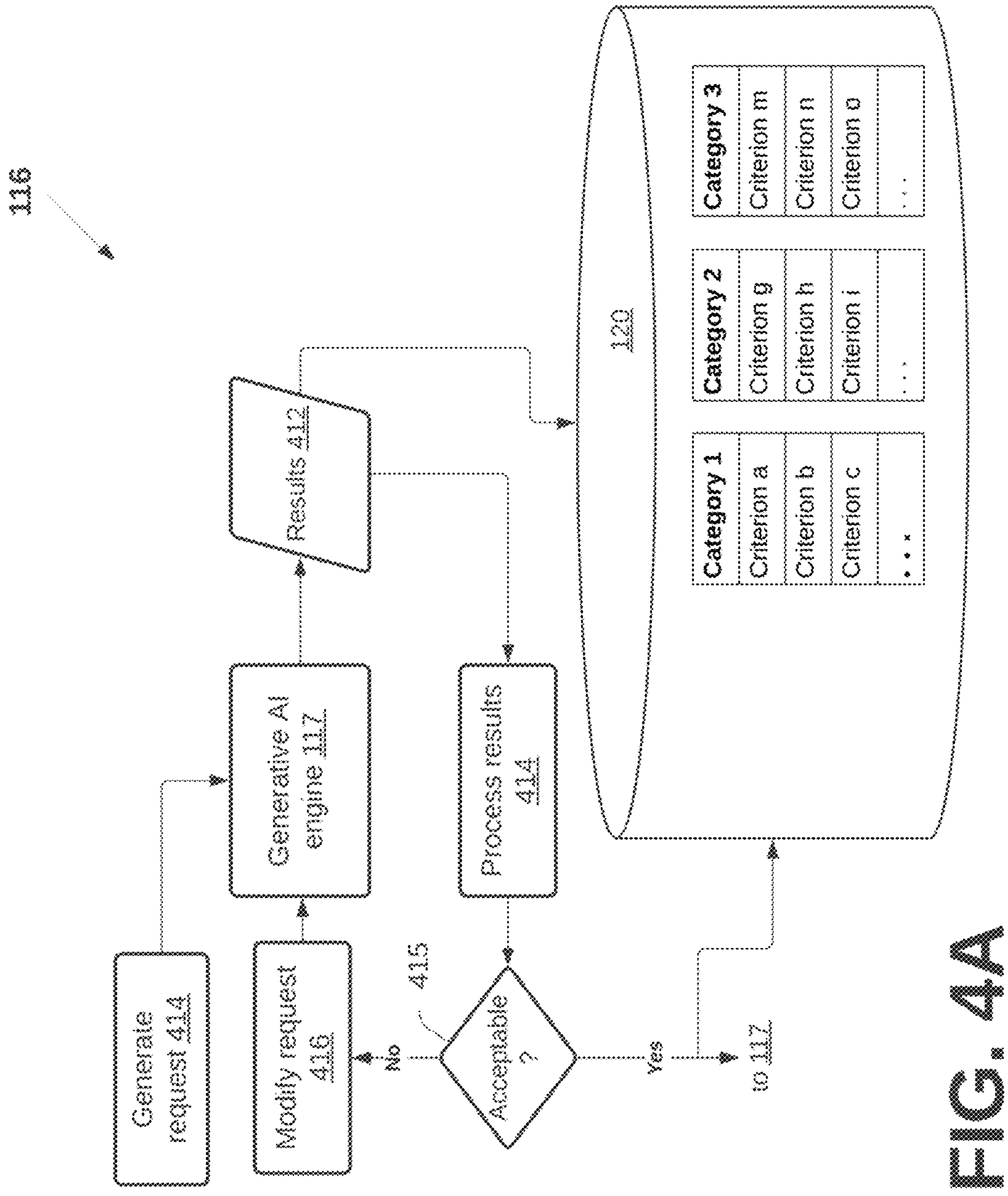
FIG. 4A shows a flowchart illustrating details of identifying criteria using generative AI/ML.

Operation 116 involves using generative AI to identify criteria. Operation 118 involves using an expert provided list of criteria. Details of operation 116 are shown in FIG. 4A. Operation 116 may employ an existing AI/ML engine that employs a Large Language Model (LLM), commonly referred to as a generative AI engine, to provide criteria for a particular category received as an input. Examples of generative AI engines that may be employed are the GPT-4 service available from OpenAI (openai.com) or the Bard service available from Google (bard.google.com). The system 10 at operation 414 generates a request for a generative AI engine 117 by accessing the AI engine 117, which may involve logging in as a human user would and accessing a visual user interface by way of a programmed bot. Alternatively, operation 414 may be performed by accessing an application programming interface (API) provided by the AI engine 117. Results 412 that are received from AI engine 117 are processed at 414 to ensure they are formatted according to a known format for further processing by system 10. The results 412 may be text in a tabular format in which case the received criteria will require little to no processing. The criteria may be in another format containing additional explanatory text. In such an instance the results 412 will require further processing at 414 to extract the text corresponding to the criteria. The output of 414 is checked at 415 to determine if the received criteria are acceptable. If the results are not acceptable, for example, if an insufficient number of criteria have not been received, then the request generated at 414 is modified, such as by adding some of the criteria received in results 412 and the modified request is submitted to the AI engine 117 and operations 412, 414 and 415 are repeated until acceptable results are identified at 415 for storage in database 120. Such results are then available for further processing by operation 119. Such results may also be stored to database 120 for subsequent use if the same category is subsequently submitted at 109.

Figure 4B:
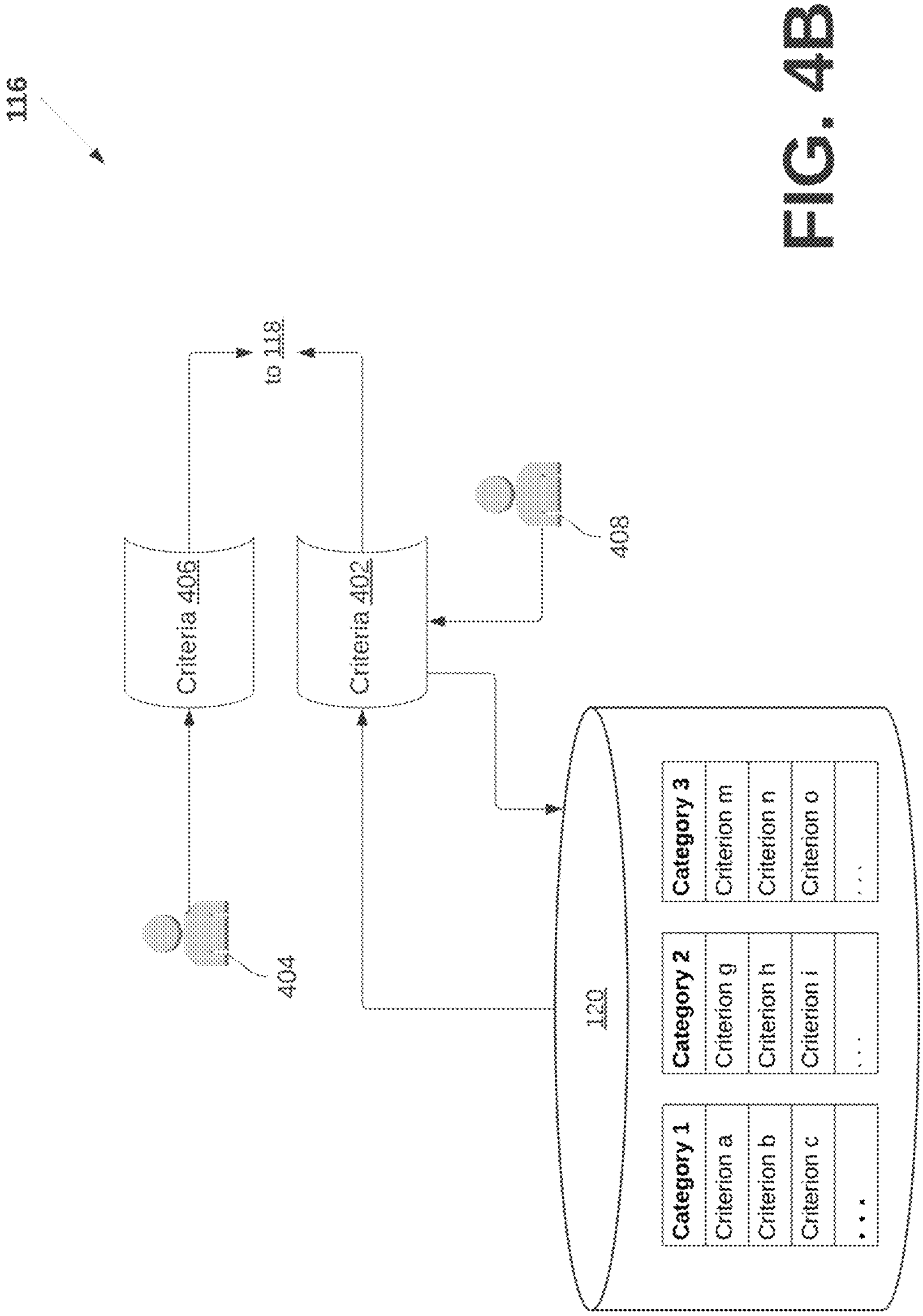
FIG. 4B shows a flowchart illustrating details of identifying criteria using expert inputs.

Further details of operation 116 are shown in FIG. 4B, where it can be seen that operation 116 may be performed by retrieving from database 120 a listing of criteria 402 that has been previously generated and stored to database 120. Such criteria may be the result of operation 116 that has been stored to database 120, as described above. The criteria 402 may be modified by one or more reviewers 408. Alternatively, the criteria may be generated by way of one or more persons 404 knowledgeable about the criteria for a particular category who interact with the system 10 to provide criteria 406 corresponding to the provided category 110. The criteria 402 or 406 is provided to operation 119.

Figure 4C:
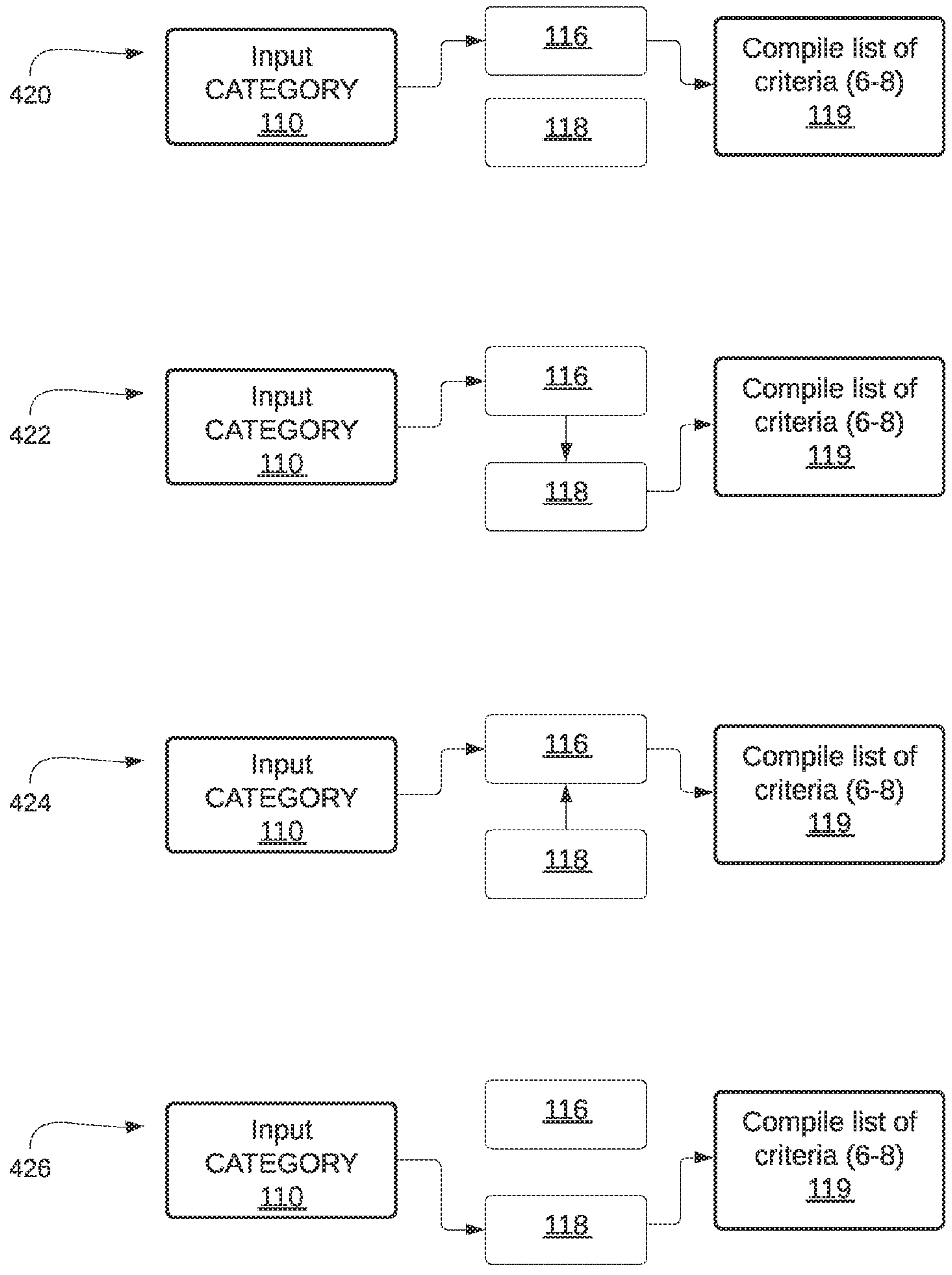
FIG. 4C shows various embodiments employing one or more of a combination of generative AI/ML and expert inputs.

In one embodiment, the stored criteria 402 is revised by a knowledgeable individual 408 before being provided to operation 119 and in such case the revised criteria are stored to database 120 for usage in connection with a subsequently provided category at 110. Operation 112 may be comprised of operations 116 or 118 or operations 116 and 118 may be combined in a variety of ways to generate criteria for operation 119, as illustrated in FIG. 4C. At 420 is shown an automated embodiment where a category 110 is processed at 116 by a generative AI engine to provide results for 119. At 422 is shown an oversight embodiment where a category 110 is processed at 116 by a generative AI engine and modified at 118 by expert analysis to provide oversight before providing results for 119. At 424 is shown an assisted embodiment where a category 110 is processed at 118 by expert analysis to generate an initial listing of criteria, which listing is provided at 118 to a generative AI engine before providing results for 119. In such an embodiment, the result from 116 may be again provided to 118 for further refinement. At 426 is shown a manual embodiment where a category 110 is processed at 118 by expert analysis to provide results for 119.

The foregoing approaches allows system 10 to break the (large) data volume dependency inherent in conventional AI/ML approaches. It also allows the delivery of a compelling solution even when a particular entity has very little or no data. This is typically the case when dealing with new product new features or a new invention on which there is little to no data. This is particularly compelling in systems that use private data, such as recommendation engines, and that target minors, such as teenagers. Another example would be the introduction of the first computer with Bluetooth. In this instantiation there would be no prior consumption data to recommend the new product using traditional AI. However, AI augmented with expert knowledge using a rule-based approach can elegantly address the shortfalls of AI.

The results provided by operation 112 are processed by operation 119 to compile a listing of criteria. In one embodiment, the processing at 119 involves identifying a predefined number range of criteria. In one embodiment such a range comprises 6-8 criteria. This is particularly recommended for consumer facing applications such as recommendation engines, as 6-8 criteria has been shown to provide a more pleasant user experience. Usually, the most effective criteria are commonly used.

The operations 112 and 119 may be better understood in the context of an example category, for example the category soccer cleats, and its associated criteria as generated at 112. The humanlike intelligence provided can identify the criteria to include Speed, Dribble, Shot Strength, Precision, in addition to Brand, Size, Price, Color etc. In another illustration a laptop would include the use of the computer such as browsing, email, programming, messaging, number crunching, gaming, streaming. This would replace the traditional solution listing ROM, RAM, CPU speed, Storage, etc.

The criteria listing generated at 119 is processed at 121 to score each criterion for each item, in other words to determine how an item with a selected criterion "perform" for the selected criterion. The score incorporates a concept of performance. For example, a score of 100 may reflect a perfect performance while a score of 0 may be assigned to an item that does not perform well in a criterion for a given category. For example, a Ferrari F430 with 540 horsepower may perform very well in the vehicle performance criterion while a Ford Pinto with 54 horsepower may not perform well. As a result, the Ferrari F430 may be assigned a score of 96 out of 100 while the Ford Pinto would receive a score of 12 out of 100. There are several techniques to generate the scores. The result of operation 119 may take the form of the data formatted as shown in Table 1 below:

TABLE 1

| Name | Criterion 1 | Criterion 2 | Criterion 3 |
|---|---|---|---|
| Item 1 | 9.3 | 2.3 | decent |
| Item 2 | 4.5 | 2.75 | decent |
| Item 3 | 5.6 | 3.4 | okay |
| Item 4 | 4.2 | 4 | excellent |
| Item 5 | 2.3 | 1.5 | okay |

Figure 5:
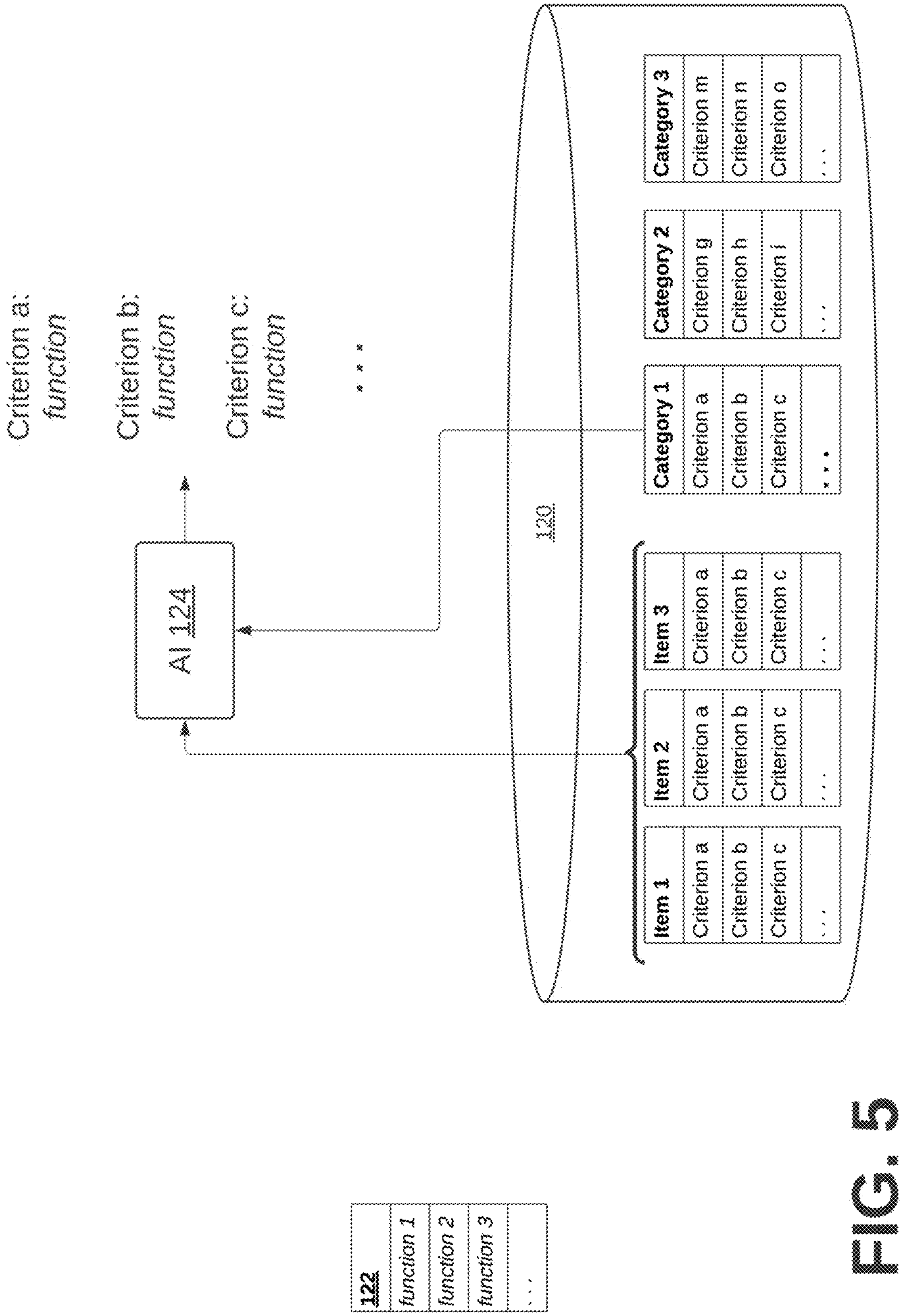
FIG. 5 illustrates further details of operation of AI module 124 of FIG. 1.

FIG. 5 illustrates further details of AI module 124 of FIG. 1 which operates to associate a function that models the criterion data (such as shown in Table 1 above) associated with items in a particular category. AI module 124 may employ a conventional neural network that is trained with data stored in storage 120. The data includes for a given category 110 (such as Category 1, Category 2, Category 3) a plurality of items (such as Item 1, Item 2, Item 3), where each item as associated therewith a plurality of criterion 104 (such as Criterion a, Criterion b, Criterion c). As shown in Table 1 above, each criterion for an item has associated there with a score that may be a numerical score (such as shown in Table 1 for Criterion 1, 2) or a textual description (such as shown in Table 1 for Criterion 3). For a given category 110, AI module 124 is trained to identify a function as provided by module 122 that fits the scores associated with the various criterion for the items within the category of interest. Such training is performed for each category to associate with each criterion of a category a function that matches the scores for the various criterion for items in the category. An example of the functions provided by module 122 and identified for a criterion of a category may be: price where the function is Price=x where x is the value of the retrieved data from the vendor database. But Price may also be perceived as a utility curve and may be linear around the target price of the buyer and then past a certain price it may take a quadratic shape. This means that past the psychological price of the buyer, the latter would expect to receive more value to pay an additional dollar and the furthest away from that psychological price point the faster the acceleration of the tradeoff value. As can be seen, more than one function may be employed. As another example, a user may represent their affinity to brand as a step function where they would associate with each brand a score between 0 and 10. In a third example, a scientist taking into account a giga counter measurement may want to emulate the values of his graph using a Fourier Series function.

Figure 6A:
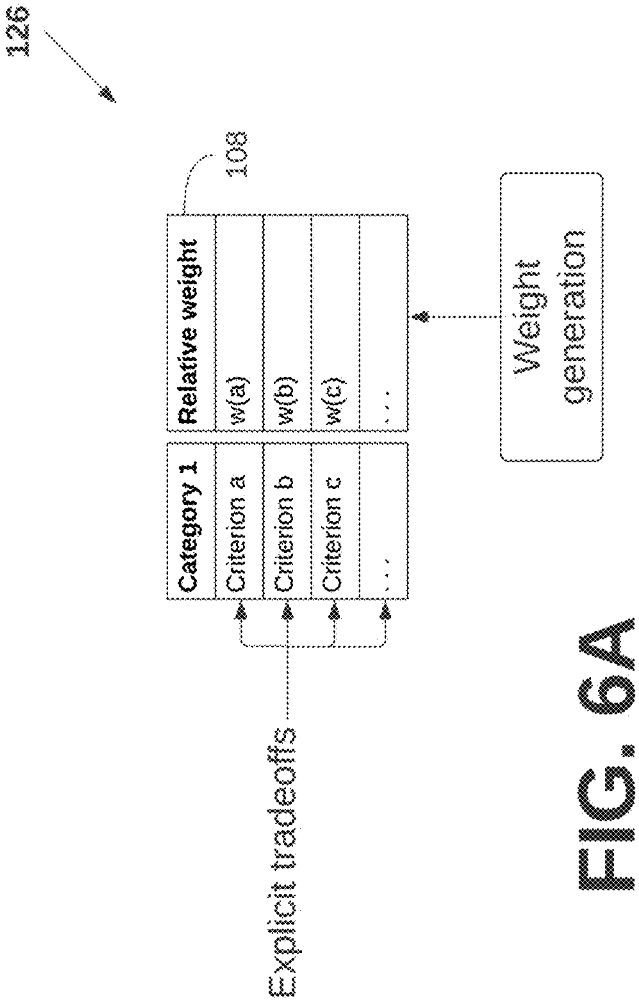
FIG. 6A illustrates operation of module 126 of FIG. 1 in response to explicit tradeoffs.

FIG. 6A illustrates operation of module 126 of FIG. 1 in response to explicit tradeoffs. The explicit tradeoffs are generated by human users which can include users of application 115 such as user 111 who may express explicit tradeoffs for a particular category 110 by way of U/I 114. For each criterion 104 of a category 110 the user 111 may provide a tradeoff in the form of a relative weights for each criterion. Each weight represent the importance of the corresponding criterion. In one instantiation, a 100 may mean really important and 0 means the criterion is not important. In one embodiment, this can be expressed by a user by sliding a set of bars associated with an equal set of criteria, In another embodiment a user may swipe (a set of criteria) and slide up or down to express the importance of a criterion. In another embodiment the user may express their tradeoffs with sentences (oral or written).

Figure 6B:
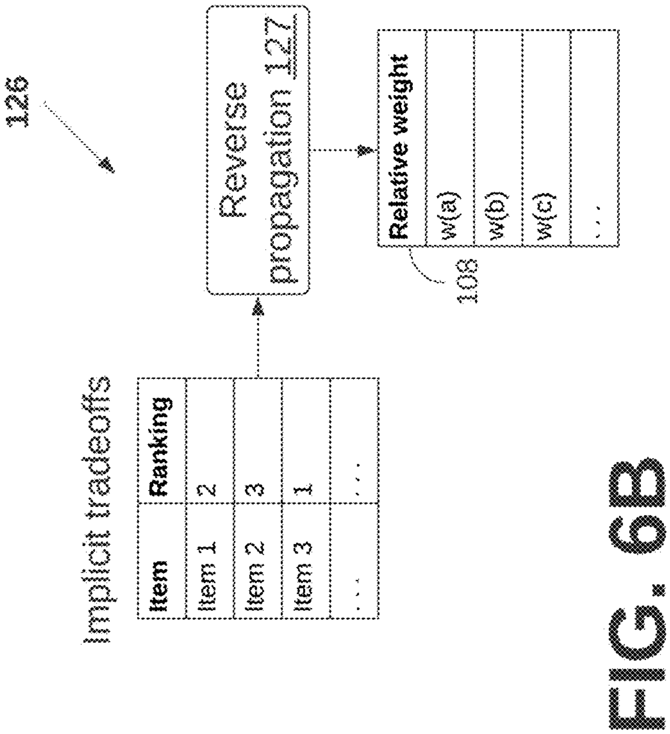
FIG. 6B illustrates operation of module 126 of FIG. 1 in response to implicit tradeoffs.

FIG. 6B illustrates operation of module 126 of FIG. 1 in response to implicit tradeoffs. Reverse propagation engine 127 generates tradeoffs 108 in the form of relative weights by receiving implicit tradeoffs in the form of ranking of items in a selected category. The rankings may be generated by An inference engine generates the weight based on a set of ordered items. Another can do so based on user behavior, such as page visits or length of click. In another instantiation the inference uses a ranking of items generated from another application, including AI or generative AI.] In one embodiment, reverse propagation engine 127 operates as described in U.S. Pat. No. 7,836,057, entitled Weighted Preference Inference System and Method, which was filed on May 23, 2007, and issued on Nov. 16, 2010, which is hereby incorporated by reference in its entirety.

Figure 7A:
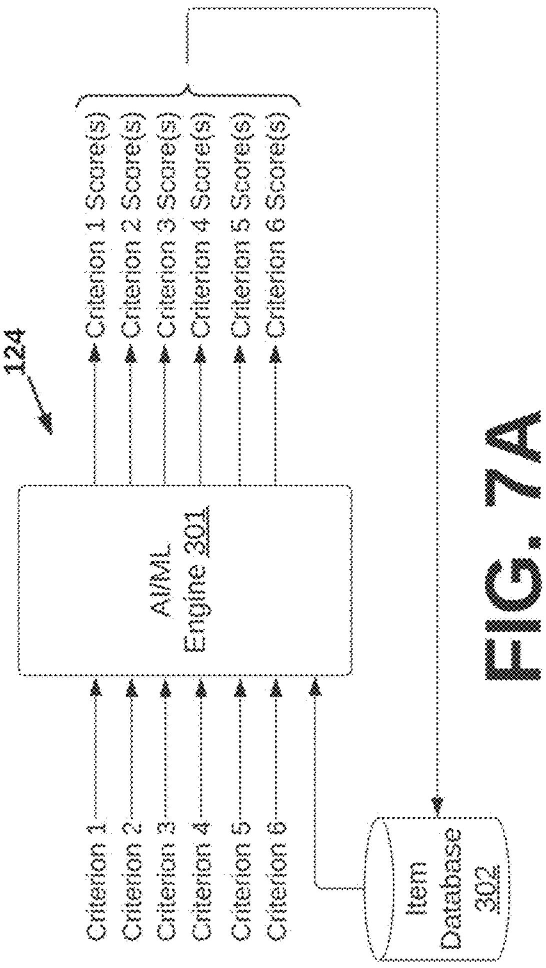
FIG. 7A shows a flowchart illustrating details of criteria scoring using generative AI/ML.

FIG. 7A shows a flowchart illustrating details of criteria scoring using generative AI/ML as performed at operation 124. In one embodiment, an AI/ML engine 301 is trained to score, for an inputted item, each of the criterion generated by operation 118. The criteria generated at 118 comprise the labels for the AI/ML engine 301 which provides for each label a score for the corresponding item, which is retrieved from an item database 302. The AI/ML engine 301 is represented in FIG. 7A for simplicity of explanation as a single block. In practice, a separate AI/ML engine 301 may be trained for each category of items. Each criteria score generated by AI/ML engine 301 is stored to item database 302 in association with the corresponding item. If a criterion for an item does not have an explicit value (e.g., specification) it may be captured from either the utility function or (generative) artificial intelligence. In another embodiment, AI/ML engine 301 may take the form of a generative AI engine that employs an LLM such as the GPT-4 service available from OpenAI (openai.com) or the Bard service available from Google (bard.google.com). In one embodiment, for an item, the criterion and score may be weighted or some other mathematical function may be performed to associate the weight and score to generate each criterion with an associated score. By way of example, in FIGS. 7A and 7B there may be two values that can be generated a) a set of weights, and b) the score or value of each item (selected) for each criterion the example is provided in the Nike example for the latter.} An example of generating the weights may be tied in eCommerce to the inventory. The inventory level may set the weight through a function of the inventory criteria. Another example would be the decision of an organization when deciding to disburse funds and selecting the projects, given the constraints imposed by budget allocation by country and by industry. As they get closer to the budget limits the importance of funding a project in a certain country or an industry.

Figure 7B:
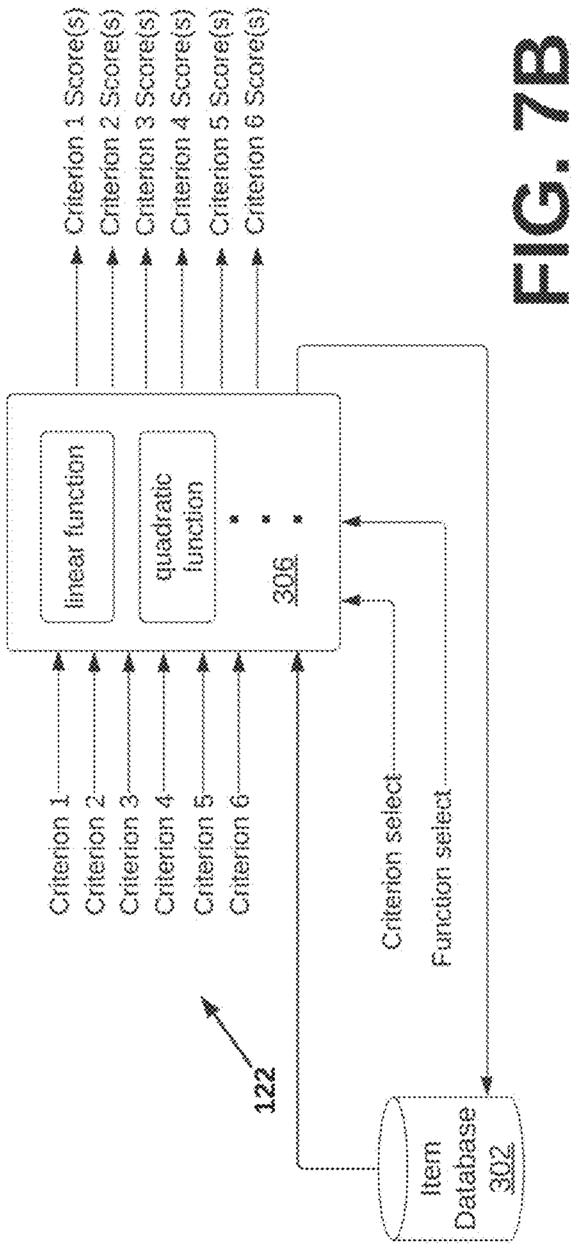
FIG. 7B shows a flowchart illustrating details of algorithmic criteria scoring.

An alternative technique for criterion scoring is shown in FIG. 7B which shows a flowchart illustrating details of algorithmic criterion scoring. A plurality of mathematical functions are provided by function module 306 which performs a selected one of the mathematical functions, in response to a function select input, upon a selected criterion, in response to a criterion select input, for a selected item from item database 302 to generate a scored criterion. The function select input may be generated by way of a rule-based program or by an AI/ML engine. The scored criterion is then stored to item database 302 in association with the corresponding item. For example, the score of an item priced $20 may be generated by a linear function, with a Min of $0 and a Max of $100 thus generating a score of 20%. Another example would be to use a quadratic function. In one embodiment, the function associated with a criterion to reflect its behavior may be generated using an AI/ML engine. For example, if we have the specifications of the soccer cleats, we may use a smaller set of data where we identify which cleat is best suited for each skill (speed, dribble, precision, shot). Then the training data would be used to rain the AI Model. In turn the model would be used to score the various cleats along the skills criteria. In one embodiment a combination of AI/ML engine 301 and function module 306 may be employed. In another embodiment, data generated by AI/ML engine 301 may be validated by function module 306 or vice-versa.

Figure 8:
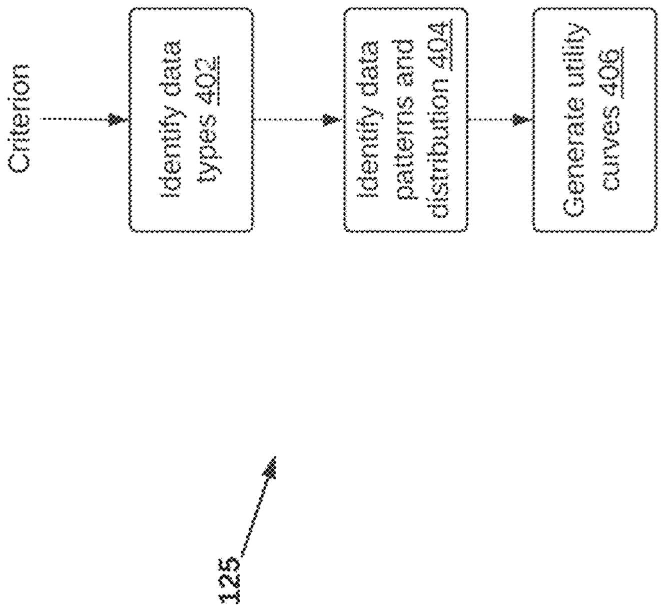
FIG. 8 shows a flowchart illustrating details of criteria analysis.

The scored criteria generated at 121 are analyzed at 125 to associate criteria behavior in order to structure the data generated, details of which are shown in FIG. 8. For each criterion, data types for the criterion are identified 402, data patterns and distribution are identified 404 and utility curves are generated 406. The data structure greatly depends on the application in which the data will be used. For example, in one instance an application may be required to analyze the data to generate a criterion behavior function or graph to handle any future data. This requires analyzing the data to identify the type (numbers, zip code, free text, enumerated types, ordered types, etc.), the pattern and distribution of data. This helps identify the criterion behavior. In an ideal situation the result of this step is to generate a series of utility curves 406, sometimes referred to as triggering functions in augmented neural networks. These functions can be used to automate the calculation of scores for new items. To illustrate the point, one embodiment may operate to receive ZIP codes as a source of data. From the ZIP codes the utility function may measure the distance to the closest warehouse to determine shipping costs. Such a shipping costs utility function may be in this case a program that calculates the distance based of a zip code. In another embodiment, a sample of data may be collected for the propensity to have cancer based on the number of cigarettes an individual has smoked. One can use a Fourier series to simulate the utility curve behavior. In yet another embodiment, the collected data along with its training sample may be used to select the best fit curve from a library of utility functions using conventional AI/ML.

At operation 128 the results of operation 126 are structured into a structured dataset, such as a spreadsheet compatible file (xls, css or other) or in a relational database format (SQL). The frequency of change of the data, and the requirement of the application to access data in real time, will determine how often the data is updated. It is anticipated that the data source may be accessed through APIs whenever APIs are available. Vendors often provide access to the specifications, price, inventory and SKUs for the item sold on their site through APIs. In another instance the data may be a mix of real time and static data. For example, price and inventory at hand may need to be captured in real time. While store zip code, or product specifications may be stored in the system. In summary, the source of the data as well as its update frequency varies within the same set.

Figure 9:
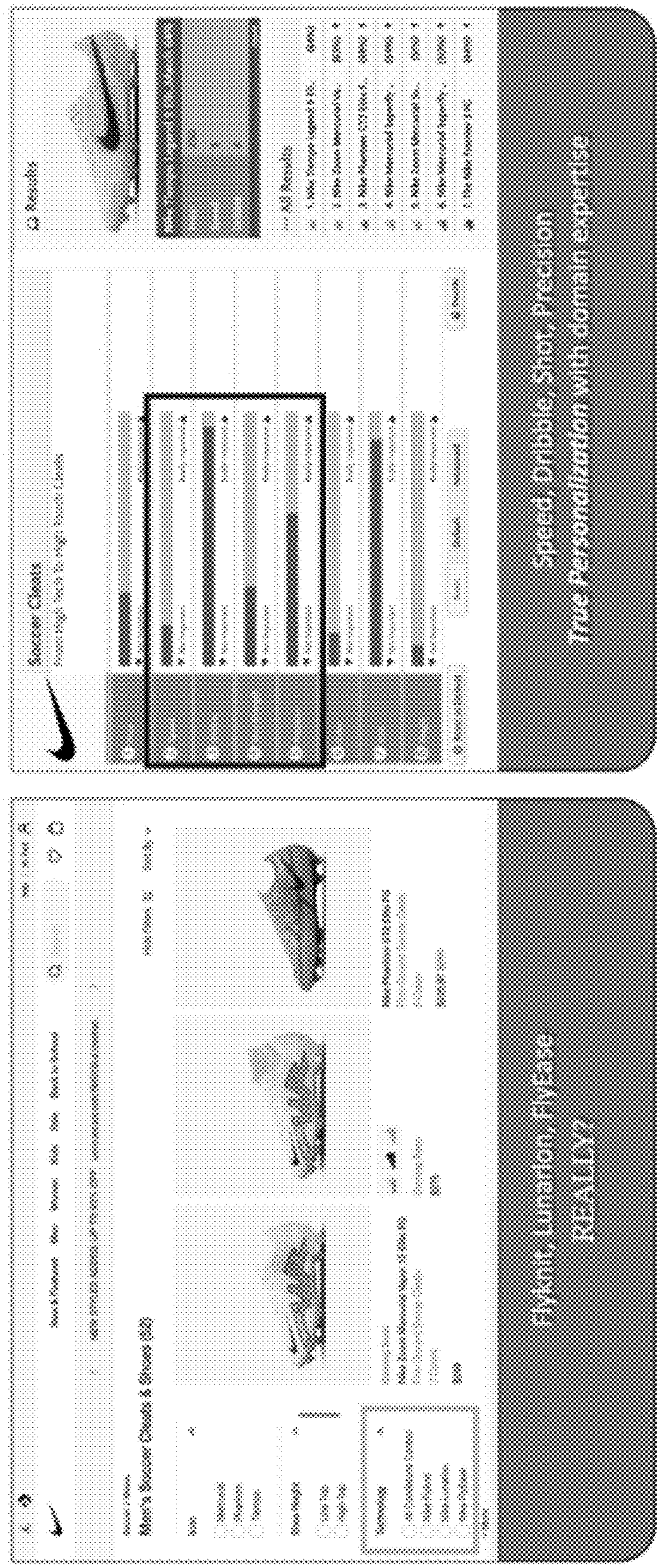
FIG. 9 shows an example user interface of an application generated using one or more disclosed embodiments.

The structured dataset generated at 128 which includes criteria for a category and the behavior for each criterion is employed at 130 to automatically generate an application. FIG. 9 shows an example user interface of an application generated using one or more disclosed embodiments. The resulting application is hosted on a server and delivered either as a service or as an application online as a web application. The resulting application may also include a generic mobile application hosted by the most popular mobile applications administrators and that is made available to serve certain categories or to be embedded in other mobile applications. For example, a retailer may incorporate in their mobile app the mobile application component for all the categories they offer to their customers. There are several techniques to generate these applications. For example, for an application that permits a selection of soccer cleats, the application will permit a consumer to choose one or several colors. The application in response provides only cleats in the selected color. Such an application provides a response to a very natural query by a human that states: "I like the pink cleats, but I would buy the blue one if they are $50 cheaper, and I absolutely do not want the green ones." That type of query is very easily and elegantly handled with the application generated at operation 130. A conventionally generated application makes it difficult for a user to discern the difference between various technologies employed in a particular product. For example, in the example of soccer cleats, one key selection criterion may be about a particular technology among a selection from Flyknit, Lunarlon or Flyease. Almost no one knows the difference between these technologies. The disclosed embodiments employing an expert system leveraging generative AI can identify the following criteria to customize the cleat selection for each individual: speed, ball control or dribble, shot strength, and precision. Using the generative AI criteria to define a player soccer skill yields a significantly better results, thus increasing customer satisfaction and the probability of a visitor to complete a purchase and then to return for the next one. The application generated at 130 may have any look and feel, as it would access the information from the back-end server using APIs.

The disclosed embodiments offer a set of APIs that are accessible and can be used as a foundation to develop new UX/UI for applications that leverage tradeoffs and generative AI. The APIs can be:

A. SCORE, with Inputs: (i) App Number which takes the form of a pointer to a set of criteria, behavior for each criterion, and data to be scored), (ii) Weights for each criterion, (iii) Criteria settings, (iv) Data Set; Output: A series of results with a score indicating proximity to a hypothetical ideal.

B. API that gets the criteria name for each category, For an Input Category Name provide as an Output: Array of Criteria.

C. INFER: Input: (i) ranked set of results, (ii) an application number, and (iii) Setting for the criteria behavior; Output: a set of weights.

In conclusion, what is disclosed herein are embodiments that address the large data requirements of AI/ML by augmenting such systems with domain knowledge. Traditionally domain, i.e., expert, knowledge has not been scalable. However, by leveraging generative AI it is possible to automate that expertise and inject it in the system either in an unassisted manner (autonomous and automated) or with the intervention of a user. Expert knowledge can be leveraged in multiple forms: rule-based systems, domain expert knowledge, programmatic approach, etc.

Traditional AI relies exclusively on data, large volume of data. It is scalable because it takes the same approach irrespective of the problem tackled. Its only requirement is voluminous data voluminous data sets. The more data the better trained the model. The better trained the model the better classification and thus answers. However, without data or in cases where it is against the law to use some data, such as private data (GDPR Compliance). AI fails to perform and deliver compelling results. Augmenting AI with domain expertise yields significantly better results, than without.

However, domain expertise type systems, such as expert systems, rule-based engines etc., were traditionally plagued by their inability to scale. The embodiments disclosed herein invention describe a unique platform and infrastructure that enables the coupling of expert systems with AI and generative AI. The disclosed embodiments facilitate the augmentation of AI with the injection of domain knowledge. The disclosed embodiments also address the causality intrinsic limitation of AI.

In one embodiment, the operations described herein take the form of a computer-implemented method for weighted preference data searching. The method determines weighted preference information including a plurality of search criteria and a corresponding plurality of weights signifying the relative importance of the search criteria. Tradeoffs that are expressed as a plurality of normalized fixed sum weights are employed. Determining the weighted preference information includes: a) determining whether there should be user input; b) providing at least one of default and automatic heuristically determined weighted preference information if there is not to be user input; c) determining whether the user should be able to select criteria; d) providing at least one of default and automatic heuristically determined criteria selections if the user is not able to select criteria; e) inputting user selection of criteria if the user is allowed to select criteria; f) determining whether the user should be able to adjust weights; g) providing at least one of default and automatic heuristically determined weights if the user is not able to adjust weights; h) inputting user selected weights if the user is allowed to adjust weights; i) determining whether the user should be able to input subjective ordering; j) providing at least one of default and automatic heuristically determined subjective ordering if the user is not able to subjectively order; k) inputting user subjective ordering if the user is allowed to subjectively order; and querying a data source and ranking the results based upon said weighted preference information.

The data source in the above-described method may take the form of a database and specifically a relational database or a data stream that may be buffered in a computer readable media. Further a subject ordering may be determined for at least one of the search criterion.

The embodiments herein can be implemented in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system. The computer-executable instructions, which may include data, instructions, and configuration parameters, may be provided via an article of manufacture including a computer readable medium, which provides content that represents instructions that can be executed. A computer readable medium may also include a storage or database from which content can be downloaded. A computer readable medium may also include a device or product having content stored thereon at time of sale or delivery. Thus, delivering a device with stored content, or offering content for download over a communication medium may be understood as providing an article of manufacture with such content described herein.

The terms "computer system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

Figure 10:
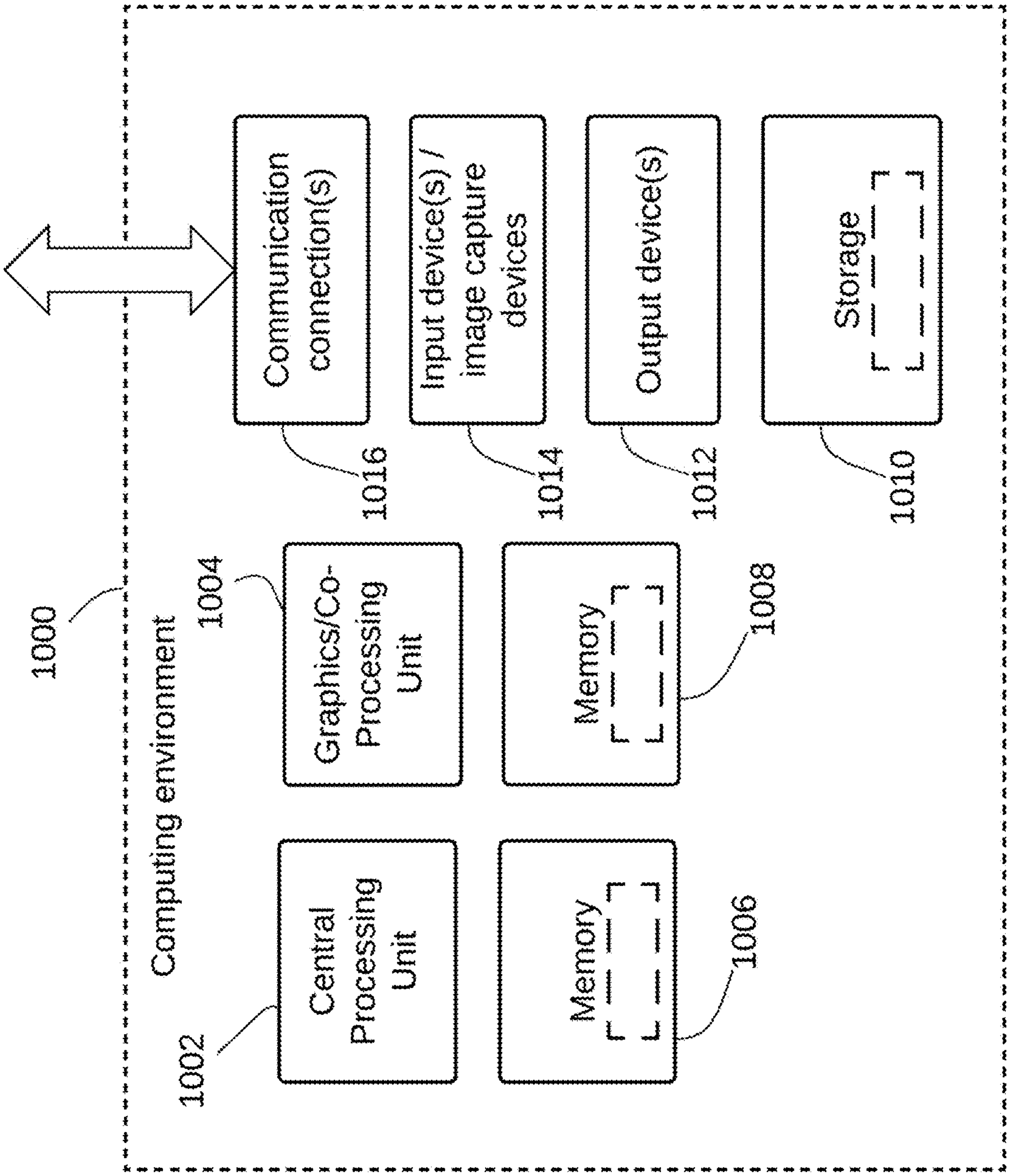
FIG. 10 is a block diagram of computer hardware that may be employed in certain embodiments of computer systems described herein.

FIG. 10 illustrates a block diagram of hardware that may be employed in an implementation of the platform 10 as disclosed herein, in which the described innovations may be implemented in order to improve the processing speed and efficiency with which the hardware operates to perform the functions disclosed herein. With reference to FIG. 10 the computing system 10 includes one or more processing units 1002, 1004 and memory 1006, 1008. The processing units 1002, 1004 execute computer-executable instructions. A processing unit can be a general-purpose central processing unit (CPU), processor in an application-specific integrated circuit (ASIC) or any other type of processor. The tangible memory 1006, 1008 may be volatile memory (e.g., registers, cache, RAM), non-volatile memory (e.g., ROM, EEPROM, flash memory, etc.), or some combination of the two, accessible by the processing unit(s). The hardware components in FIG. 10 may be standard hardware components, or alternatively, some embodiments may employ specialized hardware components to further increase the operating efficiency and speed with which the computer system 10 operates. The various components of computer system 10 may be rearranged in various embodiments, and some embodiments may not require nor include all of the above components, while other embodiments may include additional components, such as specialized processors and additional memory.

Computing system 10 may have additional features such as for example, storage 1010, one or more input devices 1014, one or more output devices 1012, and one or more communication connections 1016. An interconnection mechanism (not shown) such as a bus, controller, or network interconnects the components of the computing system 10. Typically, operating system software (not shown) provides an operating system for other software executing in the computing system 10, and coordinates activities of the components of the computing system 10.

The tangible storage 1010 may be removable or non-removable, and includes flash memory, magnetic disks, magnetic tapes or cassettes, CD-ROMs, DVDs, nonvolatile random-access memory, or any other medium that can be used to store information in a non-transitory way and that can be accessed within the computing system 10. The storage 1010 stores instructions for the software implementing one or more innovations described herein.

The input device(s) 1014 may be a touch input device such as a keyboard, mouse, pen, or trackball, a voice input device, a scanning device, or another device that provides input to the computing system 10. For video encoding, the input device(s) 1014 may be a camera, video card, TV tuner card, or similar device that accepts video input in analog or digital form, or a CD-ROM or CD-RW that reads video samples into the computing system 10. The output device(s) 1012 may be a monitor, printer, speaker, CD-writer, or another device that provides output from the computing system 10.

The communication connection(s) 1016 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

It should be understood that the functions/operations shown in this disclosure are provided for purposes of explanation of operations of certain embodiments. The implementation of the functions/operations performed by any particular module may be distributed across one or more systems and computer programs and are not necessarily contained within a particular computer program and/or computer system.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer implemented method for generating an application, the method comprising:
- receiving a category that specifies a class, or group, of items that comprise things or people that share a commonality or a common attribute;
- providing an option to generate criteria of the category by,
  - providing the category to a generative artificial intelligence service that provides in response to the category a first listing of criteria of the category; and
  - retrieving a second listing of criteria of the category from storage;
- receiving one of the first listing of criteria of the category and the second listing of criteria of the category as a selected listing of criteria;
- selecting certain criterion of the selected listing of criteria to generate a subset listing of criteria;
- scoring the subset listing of criteria to generate a scored listing comprising a score associated with each criterion in the subset listing of criteria;
- analyzing the scored listing by identifying data types and data patterns and distribution in each criterion of the scored listing and storing the results as a structured data set in a structured data format; and
- generating the application by retrieving the structured data set and generating a user interface by which a user of the application provides a user selected category and in response receives an ordered set of items within the user selected category ordered by criteria of the category.

2. The computer implemented method of claim 1 further comprising scoring each item in the ordered set of items in accordance with criteria of the category with a machine-learning engine.

3. The computer implemented method of claim 1 further comprising scoring each item in the ordered set of items in accordance with criteria of the category with a rule-based scoring engine.

4. The computer implemented method of claim 1 wherein the user interface of the application receives for the criteria of the user selected category, tradeoffs from the user expressed in a form of relative weights.

5. The computer implemented method of claim 2 wherein the operation of scoring each item in the ordered set of items in accordance with criteria of the category with a machine-learning engine comprises forming a request that complies with an application programming interface of the machine-learning engine and receiving from the machine-learning engine scores for each item in the ordered set of items.

6. The computer implemented method of claim 1 further comprising scoring each item in the ordered set of items in accordance with criteria of the category by retrieving the scoring of each item in the ordered set of items from a database.

7. The computer implemented method of claim 1 wherein the operation of scoring the subset listing of criteria to generate a scored listing comprising a score associated with each criterion in the subset listing of criteria comprises:
- providing the subset listing of criteria to an artificial intelligence/machine learning (AI/ML) engine with each criterion of the subset listing of criteria corresponding to a label for the AI/ML engine, wherein the AI/ML engine is trained to provide the score associated with each criterion of the subset listing of criteria.

8. The computer implemented method of claim 7 wherein the AI/ML engine comprises a plurality of sub-AI/ML engines where each sub-AI/ML engine is trained for the category corresponding to the subset listing of criteria.

9. The computer implemented method of claim 1 wherein the operation of scoring the subset listing of criteria to generate a scored listing comprising a score associated with each criterion in the subset listing of criteria comprises, providing the subset listing of criteria to a function module to select one of a plurality of functions.

10. The computer implemented method of claim 1 wherein the operation of analyzing the scored listing by identifying data types and data patterns and distribution in each criterion of the scored listing and storing the results as a structured data set in a structured data format comprises:
- identifying for each criterion a corresponding criterion behavior by identifying a data type, data patterns and data distribution; and
- generating a set of utility curves for each criterion that correspond to the criterion behavior.

11. A computer-implemented method that operates to generate tradeoff-based decisions by determining weighted preference information including a plurality of decision criteria obtained from a generative AI engine from a corresponding plurality of weights representing relative importance of each criterion, wherein determining weighted preference information comprises:
- obtaining a category;
- obtaining for the category a set of criteria by providing the category to a generative artificial intelligence (AI) engine, and receiving the set of criteria as results from the generative AI engine;
- identifying a function corresponding to each criterion of the set of criteria and reflecting the criterion behavior;
- using the function to quantify the unweighted contribution of each option for each corresponding criterion;
- providing a set of weights either explicitly or implicitly by inference; and
- yielding a tradeoff-based decision by ranking the results based upon the weighted preference information.

12. A server computer system that interacts with an application executing on a client computer system, the server computer system comprising:
- data storage having stored therein a database that stores information pertaining to items, where each item corresponds to a category, wherein the database includes one or more categories of items;
- a processor that executes instructions that cause the processor to:
  - provide to the application a ranking interface,
    - that receives from the application a first category and application settings in a form of tradeoffs; and
    - applies the tradeoffs to items in the database that correspond to the first category to provide to the application a ranked listing of the items from the database, where each item provided is accompanied with a corresponding score that indicates correspondence of the item to the received tradeoffs;
  - provide to the application an inference interface that,
    - receives from the application a second category and an ordered list of choices within the category that indicate a user preference;
    - infers tradeoff values to match an ordering of choices; and provides to the application a listing of criteria together with a weight for each criteria, wherein the weights correspond to the user preference.

13. The server computer system of claim 12 wherein the processor applies the tradeoffs to items in the database that correspond to the first category to provide to the application a ranked listing of the items from the database, where each item provided is accompanied with a corresponding score that indicates correspondence of the item to the received tradeoffs by:

generating, as a function of the first category and the tradeoffs, a query to a generative artificial intelligence engine for an initial set of criteria that characterize the first category, wherein the initial set of criteria comprises a plurality of criterion characterized by an ordering;

receiving the initial set of criteria and identifying a utility curve that substantially fits the initial set of criteria; and applying the utility curve to items in the database to items in the database that correspond to the first category to provide to the application a ranked listing of the items from the database.

14. The server computer system of claim 12 wherein the processor infers tradeoff values to match the ordering of choices by reverse propagation using a ranking of a subset of items in the second category.

15. The server computer system of claim 12 wherein the processor provides to the application a listing of criteria together with a weight for each criterion, wherein the weights correspond to the user preference, by:

retrieving from a database a set of items that have associated with them an ordering and using the tradeoff values to match the ordering of items and providing to the application a ranked listing of the items from the database, where each provided item is provided with a corresponding score that indicates its correspondence to the inferred tradeoffs.

* * * * *